United States Patent [19]

Noguchi et al.

[11] 4,170,968

[45] Oct. 16, 1979

[54] INTERNAL COMBUSTION ENGINE WITH AN AUXILIARY COMBUSTION CHAMBER

[75] Inventors: Masaaki Noguchi, Nagoya; Setsuro Sekiya; Kashuhiko Motosugi, both of Toyota, all of Japan

[73] Assignee: Toyota Jidosha Kogyo Kabushiki Kaisha, Toyota, Japan

[21] Appl. No.: 815,243

[22] Filed: Jul. 13, 1977

[30] Foreign Application Priority Data

Jul. 19, 1976 [JP] Japan .................... 51-85869

[51] Int. Cl.$^2$ .................... F02B 19/10; F02B 19/16
[52] U.S. Cl. .................... 123/32 SP; 123/32 L
[58] Field of Search .......... 123/191 S, 191 SP, 32 SP, 123/32 L

[56] References Cited

U.S. PATENT DOCUMENTS

| 1,515,168 | 11/1924 | Pokorney | 123/32 L |
| 3,230,939 | 1/1966 | Goossak | 123/32 SP |
| 3,416,501 | 12/1968 | Castelet | 123/32 SP |
| 4,038,959 | 8/1977 | Takizawa | 123/32 L |
| 4,076,000 | 2/1978 | Guto | 123/32 SP |

FOREIGN PATENT DOCUMENTS 1024748  2/1958  Fed. Rep. of Germany ........ 123/32 L

*Primary Examiner*—Ronald B. Cox
*Attorney, Agent, or Firm*—Stevens, Davis, Miller & Mosher

[57] ABSTRACT

Disclosed is an internal combustion engine comprising a main chamber and an auxiliary chamber which are interconnected to each other via a connecting passage. The spark plug is located in the deep interior of the auxiliary chamber remote from the main chamber. The connecting passage comprises a first open end opening into the deep interior of the auxiliary chamber, and two second open ends opening into the main chamber. When the piston reaches the top dead center position, the main chamber defines therein two spaces having approximately equal volumes and including the corresponding second open ends. The second open ends are directed to the centers of the corresponding spaces.

8 Claims, 8 Drawing Figures

INTERNAL COMBUSTION ENGINE WITH AN AUXILIARY COMBUSTION CHAMBER

DESCRIPTION OF THE INVENTION

The present invention relates to a combustion chamber of an internal combustion engine provided with an auxiliary combustion chamber. Hereinafter, a main combustion chamber and an auxiliary chamber are referred to as a main chamber and an auxiliary chamber, respectively. In order to purify the harmful components in the exhaust gas, there has been known an internal combustion engine in which a combustion chamber comprises a main chamber and an auxiliary chamber which are interconnected to each other via a connecting passage, and the electrode of a spark plug is located in the deep interior of the auxiliary chamber, which is located at a position remote from the main chamber. The connecting passage is formed so as to extend to a position near the electrode of the spark plug so that a lean air-fuel mixture or a mixture containing recirculated exhaust gas therein, introduced into the main chamber, is introduced into the space of the auxiliary chamber, which is located at a position near the electrode of the spark plug, at the time of the compression stroke. Then, the mixture introduced into the auxiliary chamber is ignited to burn the mixture in the auxiliary chamber. After this, the flame of the mixture thus ignited is injected into the main chamber via the connecting passage as a burning jet, thus causing a turbulent burning of the mixture in the main chamber.

A torch ignition type engine of this type has an advantage in that, even if the electrode of the spark plug is located in the deep interior of the auxiliary chamber which is located at a position remote from the main chamber, the mixture in the auxiliary chamber can be ignited without being affected by the residual exhaust gas remaining in the auxiliary chamber. However, in an engine of the above-mentioned type, the connecting passage has a long length, thus excessively strengthening the tendency for the burning jet to move forwards in one predetermined direction. As a result of this, satisfactory combustion in the main chamber cannot be obtained and, thus, it is impossible to fully suppress the harmful HC, CO and $NO_x$ components to be produced. In addition, in the case wherein the burning jet is strongly impinged upon the top surface of the piston so as to spread over the entire space of the main chamber, the particular portion of the top surface of the piston is excessively heated by the burning jet, thus causing a problem in that the piston will melt. Furthermore, in an engine of the above-mentioned type, while the control of combustion in the main and the auxiliary chambers has a great influence on the improvement of the output power of the engine and on the improvement of the purification of the exhaust gas, there is a disadvantage in that satisfactory control of such combustion can not be carried out in a prior engine.

An object of the present invention is to provide a combustion chamber of an internal combustion engine with an auxiliary chamber, in which the above disadvantage is eliminated by adopting an auxiliary chamber having a novel construction.

According to the present invention, there is provided an internal combustion engine comprising: a cylinder block having a cylinder bore therein; a cylinder head mounted on said cylinder block and having therein a cavity defining an auxiliary chamber; a piston reciprocally movable in said cylinder bore, said piston and said cylinder head defining a main chamber therebetween; an intake valve movably mounted on said cylinder head for leading a combustible mixture into said main chamber; an exhaust valve movably mounted on said cylinder head for discharging an exhaust gas into the atmosphere; a spark plug having a spark gap located in a deep interior of said auxiliary chamber, which is located at a position remote from said main chamber; and passage means communicating said main chamber with said auxiliary chamber and comprising at least one first open end opening into the deep interior of said auxiliary chamber at a position near the spark gap of said spark plug, and at least two second open ends opening into said main chamber defining therein two spaces which have approximately equal volume and include the corresponding second open ends when said piston reaches the top dead center position, said second open ends being directed to centers of the corresponding spaces.

The present invention may be more fully understood from the following description of preferred embodiments of the invention, together with the accompanying drawings.

DESCRIPTION OF PREFERRED EMBODIMENTS

Figure 1:
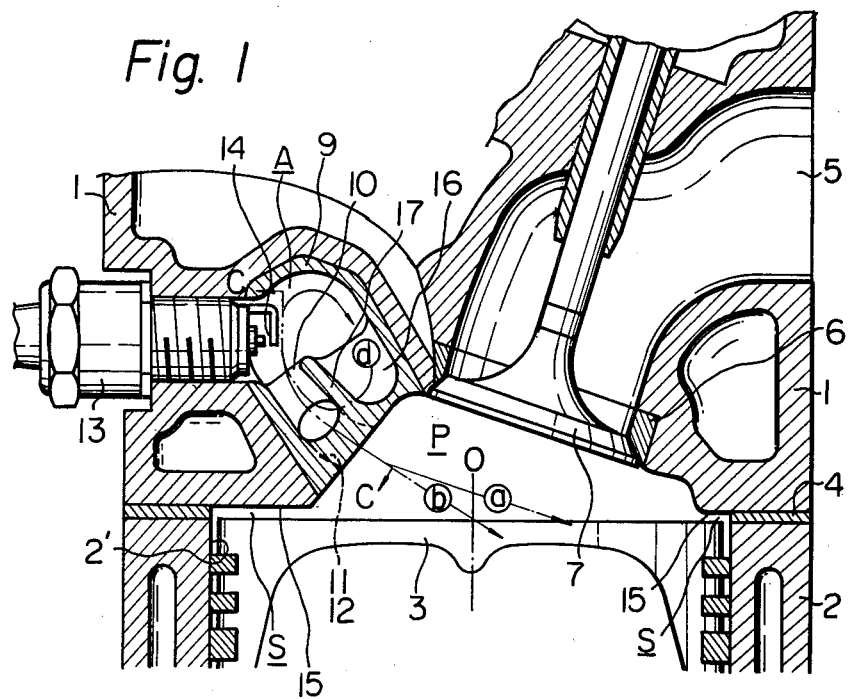
FIG. 1 is a cross-sectional view of a counter flow type engine showing a first embodiment according to the present invention.
Figure 2:
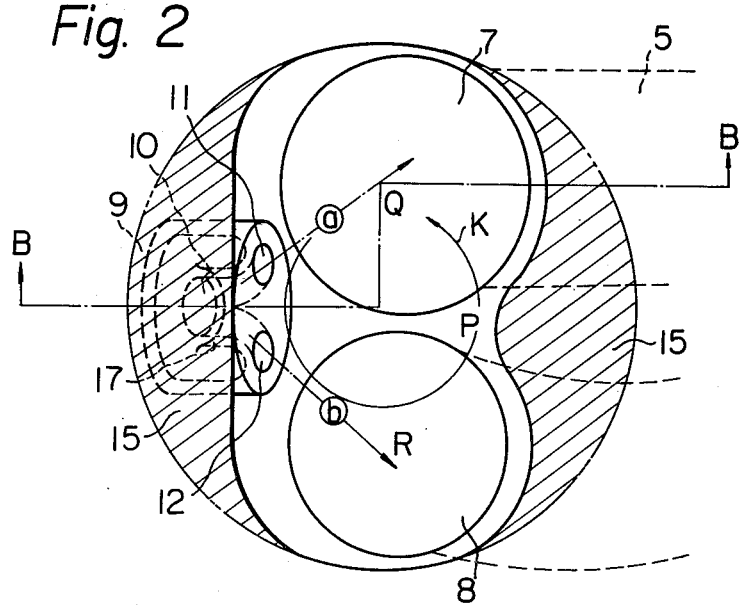
FIG. 2 is a plan view of the inner wall of the cylinder head looking from the bottom side of the cylinder head in FIG. 1.

FIGS. 1 and 2 shows a first embodiment according to the present invention. FIG. 2 shows a plan view looking from the bottom side of the cylinder head, and FIG. 1 shows a cross-sectional view taken along the line B—B in FIG. 2. Referring to FIGS. 1 and 2, a cylinder head 1 is fixed onto a cylinder block 2 via a gasket 4, and a main chamber P is defined by the cylinder head 1 and a cylinder 2' and by a piston 3 slidably inserted into the cylinder 2'. A combustible mixture is fed into the main chamber P from an intake port 5. The intake port 5 is approximately tangentially connected to the main chamber P in plan view so that the combustible mixture introduced into the main chamber P from the intake port 5 causes a swirl motion as shown by the arrow K in FIG. 2. A valve seat 6 is mounted on the cylinder head 1 at the open end of the intake port 5 so that an intake valve 7 is seated on the valve seat 6 when the intake valve 7 is closed. An auxiliary chamber component 9 is press-fitted into the cylinder head 1 from the main chamber side at a position eccentrically located relative to the central axis O of the cylinder and defines an auxiliary chamber A therein. Connecting passages 10, 11 and 12 are formed by an approximately cylindrical guide wall 17 formed in one piece on the side wall of the auxiliary chamber component 9, which is arranged to face the main chamber P, so that the connecting passages 10, 11 and 12 are tangentially connected to the circumferential wall of the auxiliary chamber component 9. The directions a and b of the openings of the connecting passages 11 and 12 are directed to the centers of the spaces Q and R, respectively, which are defined by dividing the main chamber P into two spaces Q and R so that the spaces Q and R including the open ends of the corresponding connecting passages 11 and 12 become most compact when the piston 3 reaches the top dead center position. The connecting passages 11 and 12 are joined with each other to form the single connecting passage 10 in the inside of the guide wall 17. At the time of the compression stroke, the combustible mixture in the main chamber P is forced into the auxiliary chamber A from the connecting passage 10 and creates a swirl motion in the auxiliary chamber A. In addition, a spark plug 13 is inserted into the cylinder head 1 from the outside of the cylinder head 1 and is arranged to extend through the auxiliary chamber component 9 so that the electrode 14 of the spark plug 13 is located in the auxiliary chamber A at a position near a position wherein the connecting passage 10 opens into the auxiliary chamber A.

The shape of the inner wall of the auxiliary chamber A is an ellipsoid so that the swirl motion d of the combustible mixture is created in the auxiliary chamber A. A pair of banks 15 is formed on the inner wall of the cylinder head 1 at a position located near the auxiliary chamber component 9 and at a position located opposite to the auxiliary chamber component 9 with respect to the central axis O of the cylinder. Each of the banks 15 have an approximately crescent surface arranged to closely approach the piston 3 so that squish areas S are formed between the banks 15 and the top surface of the piston 3 for creating a strong turbulence in the main chamber P.

Figure 3:
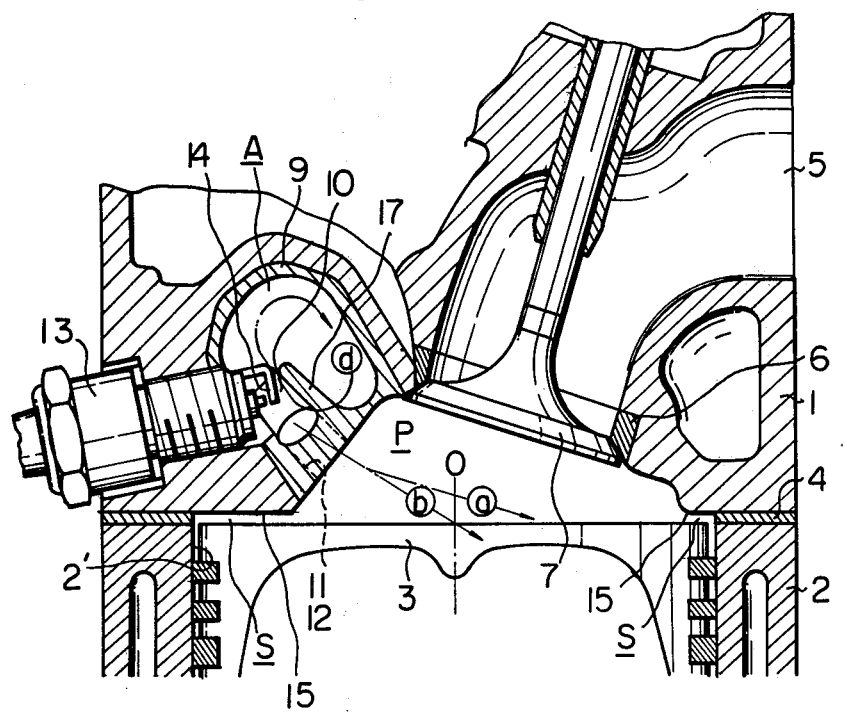
FIG. 3 is a cross-sectional view of a second embodiment according to the present invention.

The guide wall 17 and the inner wall of the auxiliary chamber component 9 are interconnected to each other by a rib 16 formed in one piece therewith so as to prevent the guide wall 17 from being melted and to control the swirl motion created in the auxiliary chamber A. In addition, in this embodiment, it is preferable that the electrode 14 of the spark plug 13 be located in the region wherein the combustible mixture swirled in the auxiliary chamber A does not pass, so that the residual exhaust gas swirling in the auxiliary chamber together with the combustible mixture does not reach the electrode 14 of the spark plug 13. Consequently, as is shown in FIG. 3, in order to ensure that the swirled residual exhaust gas does not reach the electrode 14 of the spark plug 13, the electrode 14 of the spark plug 13 may be arranged in the connecting passage 10.

As mentioned above, since the spark plug 13 is so arranged that the swirled residual exhaust gas does not reach the electrode 14 of the spark plug 13, the combustible mixture is ignited by the spark plug 13 without being affected by the residual exhaust gas remaining in the auxiliary chamber A when the piston reaches a position near top dead center at the time of the compression stroke. After this, the flame of the combustible mixture thus ignited immediately propagates to the open end of the connecting passage 10, which opens to the auxiliary chamber A and, as a result, the unburned mixture in the auxiliary chamber A can be prevented from injecting into the main chamber P via the connecting passage 10. In addition, the flame propagates into the auxiliary chamber A in which the controlled swirl motion of the combustible mixture is created as mentioned above, whereby the combustion in the auxiliary chamber A is controlled so that it advances at an optimum speed. As a result of this, the energy of the burning jet can be increased and, in addition, the burning jet can continue to inject for a long time.

The burning jet injected into the main chamber P from the connecting passages 11 and 12 in the desired directions a and b causes the turbulence in the main chamber P. In addition, the combustible mixture introduced from the intake port 5 at the time of the intake stroke causes the swirl motion swirling around the axis of the cylinder in the main chamber P and, then, the swirl motion this formed in the main chamber P is strengthened at the time of the compression stroke. Furthermore, the squish flow of the combustible mixture pushed out from the squish areas 15 causes the turbulence in the main chamber P. Consequently, the burning jet, the swirl motion created in the main chamber P and the squish flow cause the turbulent burning in the main chamber P and, as a result, the combustion in the main chamber P is completed in a short period. In the present invention, the combustion in the main chamber P is controlled in such a way that a plurality of the connecting passages is so arranged that the openings of the connecting passages are directed to the most effective directions for causing good combustion in the main chamber P and in such a way that the sizes of the cross-sectional areas of the connecting passages are appropriately set.

Figure 4:
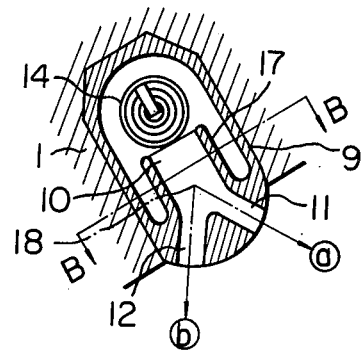
FIG. 4 is a cross-sectional view of the connecting passage taken along the line C—C in FIG. 1.
Figure 5:
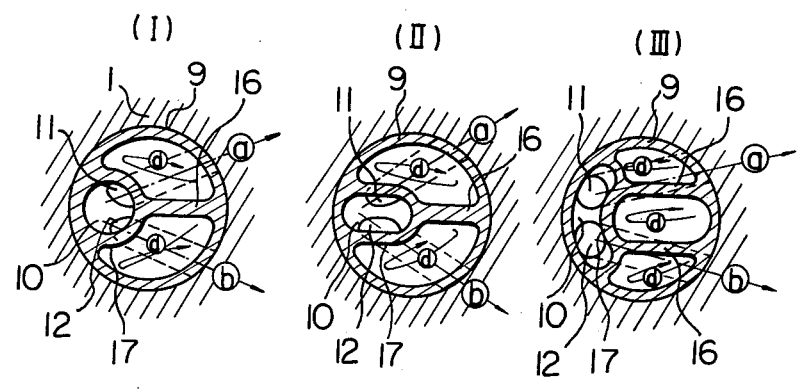
FIG. 5 is a cross-sectional view of the auxiliary chamber component of the first embodiment taken along the line B—B in FIG. 4.

FIG. 4 shows a cross-sectional view of the connecting passages 10, 11 and 12, taken along the line C—C in FIG. 1. FIG. 5 shows a cross-sectional view taken along the line B—B in FIG. 4. In FIG. 5, FIG. (I) shows an embodiment in which the open end of the connecting passage 10, which opens into the auxiliary chamber A, is formed in a circular cross-section. FIG. (II) shows an embodiment in which the stability of ignition and combustion when the engine is operating under a light load is improved in such a way that the open end of the connecting passage 10, which opens into the auxiliary chamber A, is so formed that the cross-sectional area of said open end of the connecting passage 10 is larger than the sum of the cross-sectional areas of the connecting passages 11 and 12. FIG. (III) shows an embodiment in which the connecting passage 10 is arranged to extend along the inner wall of the auxiliary chamber component 9 so as to be interconnected with the connecting passages 11 and 12 when the connecting passages 11 and 12 are arranged as shown in FIG. 4 in accordance with the shape of the main chamber P.

Figure 6:
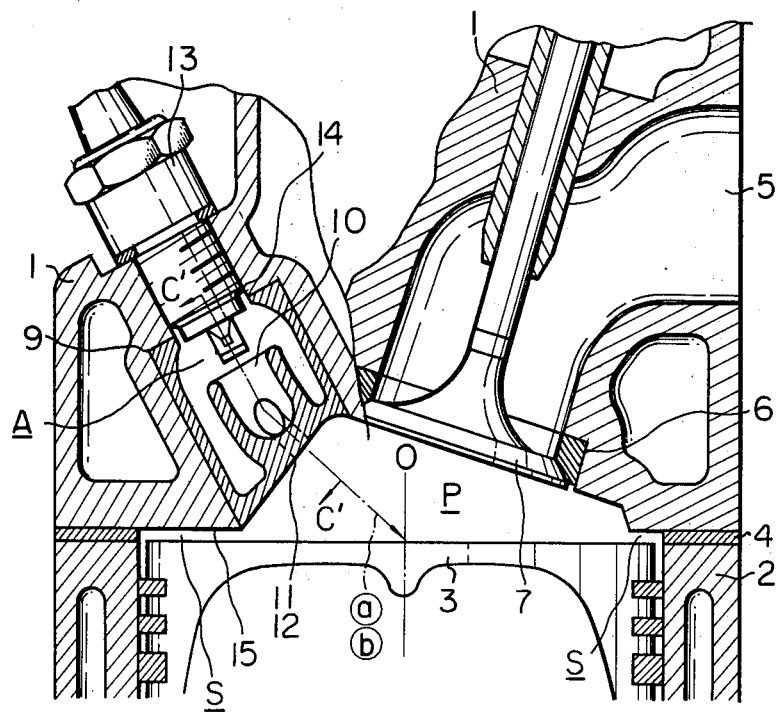
FIG. 6 is a cross-sectional view of a third embodiment according to the present invention.
Figure 7:
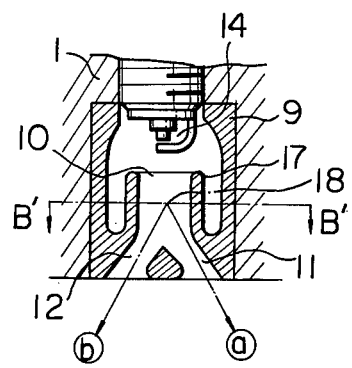
FIG. 7 is a cross-sectional view of the connecting passage taken along the line C'—C' in FIG. 6.

FIGS. 6 and 7 show another embodiment of FIG. 1 according to the present invention. In this embodiment, similar components are indicated with the same reference numerals as used in FIG. 1, and the description of the similar components is omitted. In this embodiment, the open end of the connecting passage 10, which opens into the auxiliary chamber A, is arranged on an approximately central axis of the auxiliary chamber A, and the spark plug 13 is located in the deep interior of the auxiliary chamber component 9 remote from the main chamber P. In addition, the electrode 14 of the spark plug 13 is located in the vicinity of the open end of the connecting passage 10, which opens into the auxiliary chamber A, so that the ignition is improved.

Figure 8:
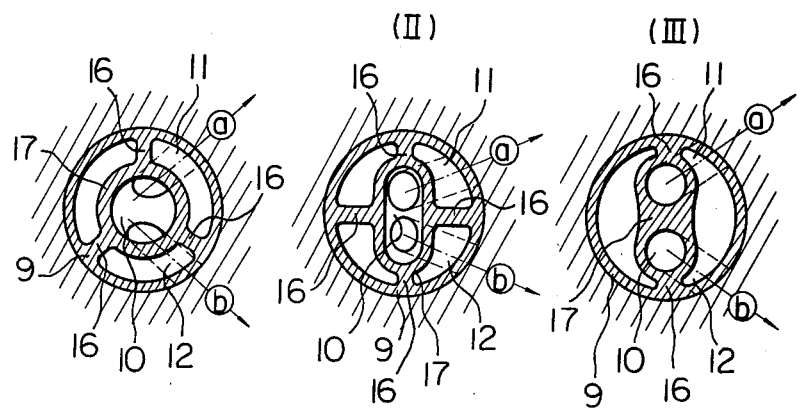
FIG. 8 is a cross-sectional view of the auxiliary chamber component of the third embodiment taken along the line B'—B' in FIG. 7.

FIG. 7 shows a cross-sectional view of the connecting passages 10, 11 and 12, taken along the line C'—C' in FIG. 6. FIG. 8 shows a cross-sectional view taken along the line B'—B' in FIG. 7. In FIG. 8, FIG. (I) shows an embodiment in which the open end of the connecting passage 10, which opens into the auxiliary chamber A, is formed in a circular cross-section. FIG. (II) shows an embodiment in which, when the combustible mixture is forced into the connecting passage 10 from the connecting passages 11 and 12 at the time of the compression stroke, the combustible mixture does not cause the turbulence in the connecting passage 10, thus improving the ignition. FIG. (III) shows an embodiment in which, when the combustible mixture is introduced into the main chamber P via the intake valve 7 (FIG. 6), the combustible mixture is introduced into the auxiliary chamber A via the connecting passage 11 which is so arranged that its opening is directed to the intake valve 7. Then, since the combustible mixture introduced into the auxiliary chamber A flows into the connecting passage 12, the residual exhaust gas remaining in the auxiliary chamber A is scavenged by the combustible mixture to some extent, thereby further improving the ignition.

According to the present invention, at least two connecting passages communicating the main chamber with the auxiliary chamber are provided, and the connecting passages are extended so that their open ends open into the auxiliary chamber at a position near the electrode of the spark plug located in the deep interior of the auxiliary chamber. In addition, the openings of the connecting passages are arranged to be directed to the centers of corresponding spaces which are formed by equally dividing the main chamber into two spaces, each including the corresponding open end of the connecting passage when the piston reaches the top dead center position. As a result of the above arrangements of the connecting passages, at the time of the compression stroke, the combustible mixture in the main chamber is forced into the auxiliary chamber via the connecting passages and, then, the combustible mixture creates the controlled swirl motion in the auxiliary chamber while scavenging the residual exhaust gas remaining around the electrode of the spark plug. As a result of this, since the combustible mixture which can be easily ignited is distributed around the electrode of the spark plug, the ignition can be ensured. In addition, since the flame of the combustible mixture thus ignited rapidly covers the open end of the connecting passage, which opens into the auxiliary chamber, it is possible to minimize chances for the unburned mixture in the auxiliary chamber to escape into the main chamber. Furthermore, since the connecting passages are arranged so as to control the gas stream in the auxiliary chamber, the controlled combustion is carried out in the auxiliary chamber and, as a result, the burning jet can continue to inject into the main chamber for a long time. In addition, since the connecting passages are arranged so that the burning jet is uniformly injected over the entire space of the main chamber, the combustion in the main chamber can be completed in a short period.

From experiments conducted by the inventor, it has been proven that it is preferable that the ratio of the volume of the auxiliary chamber to the volume of the entire combustion chamber is in the range of 0.06 through 0.25:1 when the piston is positioned at the top dead center position; the ratio of the sum of the cross-sectional areas of the open ends of the connecting passages, which open into the main chamber, to the volume of the auxiliary chamber being in the range of 0.08 through 0.25 cm$^{-1}$:1; the ratio of the sum of the cross-sectional areas of the open ends of the connecting passages, which open into the main chamber, to the sum of the cross-sectional areas of the open ends of the connecting passages, which open into the auxiliary chamber, being in the range of 0.6 through 1.6:1.

According to the present invention, even if a lean air-fuel mixture or a mixture containing recirculated exhaust gas therein is used and, in addition, the electrode of the spark plug is located in the deep interior of the auxiliary chamber, ignition can be ensured. Furthermore, since the burning jet can uniformly reach over the entire space of the main chamber, it is possible to reduce the amount of harmful HC, CO and NO$_x$ components in the exhaust gas while preventing the reduction of the output power of the engine. In addition, even if the exhaust gas recirculating operation is carried out, the combustible mixture in the auxiliary chamber can be ignited without being affected by the residual exhaust gas remaining in the auxiliary chamber. Furthermore, since the burning jet causes the combustion in the main chamber while fully mixing the combustible mixture with the recirculated exhaust gas in the main chamber, a rapid and a stable combustion is caused in the main chamber. As a result, the fluctuation of torque is maintained at a low level and, in addition, the amount of harmful HC, CO and NO$_x$ components in the exhaust gas can be reduced.

While the invention has been described by reference to specific embodiments chosen for purposes of illustration, it should be apparent that numerous modifications could be made thereto by those skilled in the art without departing from the spirit and scope of the invention.

What is claimed is:

1. An internal combustion engine comprising:
   a cylinder block having a cylinder bore therein;
   a cylinder head mounted on said cylinder block and having therein a cavity defining an auxiliary chamber;
   a piston reciprocally movable in said cylinder bore, said piston and said cylinder head defining a main chamber therebetween;
   an intake valve movably mounted on said head for leading a combustible mixture into said main chamber;
   an exhaust valve movably mounted on said cylinder head for discharging exhaust gas into the atmosphere;
   a spark plug having a spark gap located in said auxiliary chamber; and
   passage means communicating said main chamber with said auxiliary chamber and comprising a first passage having a first open end opening into the interior of said auxiliary chamber at a position near the spark gap of said spark plug, and second passages joined with said first passage and having second open ends opening into said main chamber defining therein two spaces which have approximately equal volumes and include the corresponding second open ends when said piston reaches the top dead center position, said second open ends being directed to centers of the corresponding spaces.

2. An internal combustion engine as claimed in claim 1, wherein the spark gap of said spark plug is located in the interior of the auxiliary chamber, which is located at a position remote from the main chamber.

3. An internal combustion engine as claimed in claim 1, wherein the spark gap of said spark plug is located in said passage means.

4. An internal combustion engine as claimed in claim 1, wherein said first passage is formed in a guide wall extending towards the interior of said auxiliary chamber.

5. An internal combustion engine as claimed in claim 4, wherein said guide wall is connected to an inner wall of said auxiliary chamber via at least one rib.

6. An internal combustion engine as claimed in claim 1, wherein said first passage is arranged along an inner wall of said auxiliary chamber, said first open end opening into said auxiliary chamber at the periphery of said auxiliary chamber.

7. An internal combustion engine as claimed in claim 1, wherein said first passage is arranged on a central axis of said auxiliary chamber.

8. An internal combustion engine as claimed in claim 1, wherein the ratio of the volume of said auxiliary chamber to the sum of the volumes of said auxiliary chamber, said passage means and said main chamber is in the range of 0.06 through 0.25:1 when the piston reaches the top dead center position, the ratio of the sum of the cross-sectional areas of said second open ends to the volume of said auxiliary chamber being in the range of 0.08 through 0.25 cm$^{-1}$:1, and the ratio of the sum of the cross-sectional areas of said second open ends to the cross-sectional area of said first open end being in the range of 0.6 through 1.6:1.

* * * * *